Patented May 27, 1924.

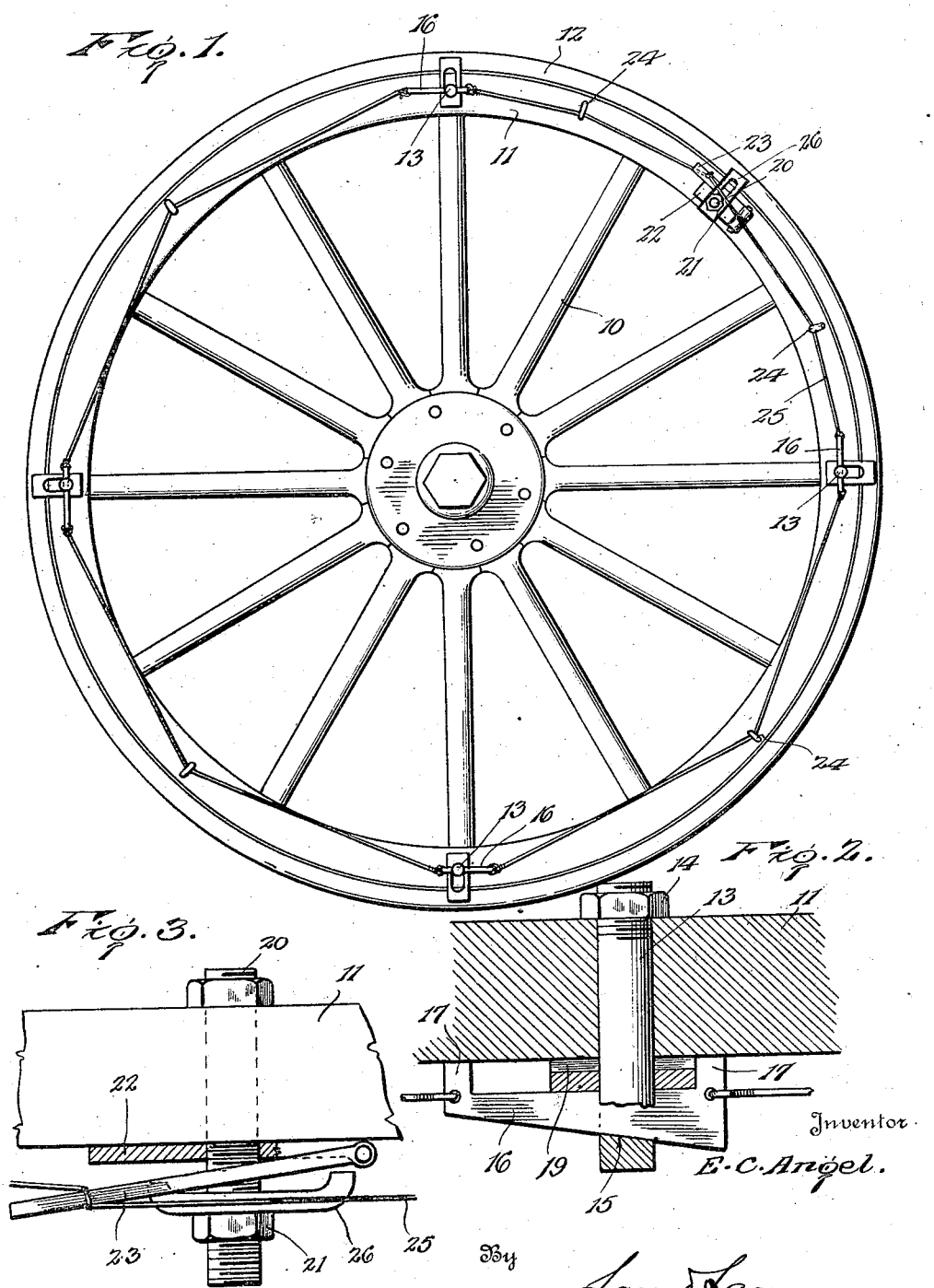

1,495,546

UNITED STATES PATENT OFFICE.

ELMER C. ANGEL, OF EAST PALESTINE, OHIO.

RIM LOCK.

Application filed April 25, 1922. Serial No. 556,449.

*To all whom it may concern:*

Be it known that I, ELMER C. ANGEL, a citizen of the United States, residing at East Palestine, in the county of Columbiana and State of Ohio, have invented certain new and useful Improvements in Rim Locks, of which the following is a specification.

This invention relates to an improved rim lock for the demountable rims of motor vehicle wheels and seeks, as one of its principal objects, to provide an arrangement whereby a rim may be quickly secured upon a wheel with a minimum of difficulty.

A further object of the invention is to provide a rim lock employing a plurality of rim clamps and wherein all of the clamps may be simultaneously shifted to engage the rim securing the rim in position.

And the invention has as a still further object to provide a rim lock which will be sturdy and secure and which may be readily employed in connection with conventional motor vehicle wheels and rims.

Other and incidental objects will appear hereinafter.

In the drawing:

Figure 1 is a side elevation showing a conventional motor vehicle wheel equipped with my improved rim lock, Figure 2 is an enlarged detail sectional view showing the mounting of the wedges and clamps employed, and Figure 3 is a detail plan view, partly in section, this view particularly illustrating the locking lever of the device.

Referring now more particularly to the drawing, I have, for convenience, shown my improved rim lock in connection with a conventional motor vehicle wheel 10 having the usual felly 11 and surrounding the felly is a rim 12 removable at the outer side of the wheel or that side of the wheel remote from the vehicle. In carrying the present invention into effect, I employ a plurality of bolts or supporting elements 13, which, as shown in Figure 2, are fitted transversely through the felly 11 of the wheel from the inner side thereof and threaded upon the bolts at their inner ends are nuts 14. The bolts are arranged at suitably spaced points circumferentially of the felly and formed in the outer ends of said bolts are slots 15. Slidably fitting through these slots are wedges 16 having inclined outer side edges and, in this connection, it will be observed that the outer end walls of the slots 15 of the bolts are beveled so that the inclined edges of the wedges will seat flat thereagainst. The wedges are formed with straight inner side edges and projecting from the wedges at their ends are stop lugs 17 abutting the felly 11 spacing the wedges therefrom. Accommodated between the wedges and the felly are rim clamps 19 slotted to receive the bolts 13 and coacting at corresponding ends thereof with the felly while the opposite ends of said wedges are disposed to engage the rim 12 at its adjacent side.

Fitting transversely through the felly, substantially midway between a pair of the bolts 13, is a bolt 20 upon the outer end of which is arranged a nut 21 and threaded upon said bolt to seat flat against the outer side face of the felly is a plate 22. Mounted at the upper edge of this plate is a locking lever 23 pivoted at one end to one end of the plate, the lever being also adapted to seat flat against the felly, and arranged upon the bolt to normally overlie both the plate and lever is a clamp 26 similar to the clamps 19. Extending through the felly at points substantially midway between the bolts 13 as well as at opposite sides of the bolt 20, are eye bolts 24 and extending through the eyes of said bolts are cables 25 secured to the ends of the wedges 16 and to the locking lever 23, these cables connecting all of the wedges with each other and with said lever.

As will now be readily understood in view of the preceding description, the lever 23 may, by releasing the nut 21 and disposing the clamp 26 horizontally upon the bolt 20, be swung away from the felly 11, as shown in Figure 3, when the wedges 16 will be moved endwise for releasing the clamps 19 so that the clamps may then be retracted and the rim 12 removed from the wheel, it being noted in this connection, that the stop lugs 17 of the wedges will coact with the clamps for limiting endwise movement of the wedges. On the other hand, by swinging the lever 23 in the opposite direction to seat against the felly, the wedges will be advanced against the clamps for binding the clamps in engagement with the rim and locking the rim upon the wheel. This done, the clamp 26 is disposed vertically to coact with the rim overlying the plate 22 and lever 23 when the nut 21 is threaded down upon the bolt 20 to bind said clamp against the rim and lock the lever against movement.

The rim may thus be effectually secured upon the wheel with a minimum of difficulty and attention is now directed to the fact that should the wedges 16 become worn through repeated operation thereof, the nuts 14 may be adjusted upon the bolts 13 for retracting the bolts through the felly and taking up such wear.

Having thus described the invention, what is claimed as new is:

1. The combination with a wheel having a felly, and a rim removably surrounding the felly, of clamps mounted to engage the rim, wedges arranged to coact with the clamps, a bolt extending through the felly, a plate mounted upon said bolt, a lever pivoted upon said plate, means connecting all of the wedges with said lever whereby the lever may be swung for shifting the wedges and binding the clamps in engagement with the rim, and a nut threaded upon the bolt for locking the lever against retrograde movement.

2. The combination with a wheel having a felly and a rim removably surrounding the felly, of supporting elements projecting from the felly and provided with slots, clamps on said elements, wedges slidable in said slots to coact with the clamps binding the clamps in engagement with the rim, and means for shifting the wedges.

3. The combination with a wheel having a felly, and a rim removably surrounding the felly, spaced supporting means projecting from the felly, clamps on said means, and wedges slidable through said means to coact with the clamps binding the clamps in engagement with the rim.

4. The combination with a wheel having a felly, and a rim removably surrounding the felly, of bolts extending through the felly, clamps on said bolts, wedges slidable through the bolts to coact with the clamps binding the clamps in engagement with the rim, and nuts adjustable upon the bolts for taking up wear upon the wedges.

5. The combination with a wheel having a felly, and a rim removably surrounding the felly, of bolts projecting from the felly, clamps loosely mounted on said bolts, and wedges slidable through the bolts to coact with the clamps binding the clamps in engagement with the rim.

In testimony whereof I affix my signature.

ELMER C. ANGEL. [L. S.]